G. L. LANGER.
WEIGHING AND PACKAGING MACHINE.
APPLICATION FILED JAN. 5, 1916. RENEWED SEPT. 15, 1921.

1,413,857.

Patented Apr. 25, 1922.

G. L. LANGER.
WEIGHING AND PACKAGING MACHINE.
APPLICATION FILED JAN. 5, 1916. RENEWED SEPT. 15, 1921.

1,413,857.

Patented Apr. 25, 1922.
8 SHEETS—SHEET 2.

Fig. 2.

Witnesses:

G. L. LANGER.
WEIGHING AND PACKAGING MACHINE.
APPLICATION FILED JAN. 5, 1916. RENEWED SEPT. 15, 1921.

1,413,857.

Patented Apr. 25, 1922.
8 SHEETS—SHEET 5.

G. L. LANGER.
WEIGHING AND PACKAGING MACHINE.
APPLICATION FILED JAN. 5, 1916. RENEWED SEPT. 15, 1921.

1,413,857.

Patented Apr. 25, 1922.
8 SHEETS—SHEET 6.

Fig. 8.

Witnesses:

Inventor,

Att'y.

G. L. LANGER.
WEIGHING AND PACKAGING MACHINE.
APPLICATION FILED JAN. 5, 1916. RENEWED SEPT. 15, 1921.

1,413,857.

Patented Apr. 25, 1922.
8 SHEETS—SHEET 7.

Fig. 9.

UNITED STATES PATENT OFFICE.

GOTTHOLD L. LANGER, OF PORTLAND, OREGON, ASSIGNOR, BY DIRECT AND MESNE ASSIGNMENTS, TO STICKY FRUIT PACKAGING MACHINE COMPANY, OF PORTLAND, OREGON, A CORPORATION OF OREGON.

WEIGHING AND PACKAGING MACHINE.

1,413,857. Specification of Letters Patent. Patented Apr. 25, 1922.

Application filed January 5, 1916, Serial No. 70,461. Renewed September 15, 1921. Serial No. 500,956.

*To all whom it may concern:*

Be it known that I, GOTTHOLD L. LANGER, a citizen of the United States, residing in the city of Portland, county of Multnomah, and State of Oregon, have invented certain new and useful Improvements in Weighing and Packaging Machines, of which the following is a specification.

My invention relates to weighing and packaging machines, and more particularly to machines adapted for weighing pre-determined quantities of raisins, or other matter, and for automatically wrapping the same into suitable packages.

Among the salient objects of my invention are,—to provide a machine of the character referred to in which the matter to be weighed is fed into a receptacle until the proper amount trips a weighing device, set for determining the amount of matter to be put into one package, whereupon said receptacle automatically discharges said matter to be wrapped; to provide means for automatically feeding wrapping paper into a position to receive said matter; to provide in such a machine means over which said wrapping paper is placed, ready to receive the contents of the receptacle thereupon, whereby said matter forces said paper down among folding devices, which are automatically operated to fold the paper around said contents, and make a package of proper form to be inserted into a suitable box, or carton, adapted to receive the same, and, in general, to provide a machine which will automatically weigh a definite quantity of matter, wrap it into a suitable package, and discharge said package into a previously placed box, or carton.

In order that others may clearly understand my invention, I have illustrated in the accompanying sheets of drawings a preferred embodiment thereof, which I will now describe.

Figures 1, 10:
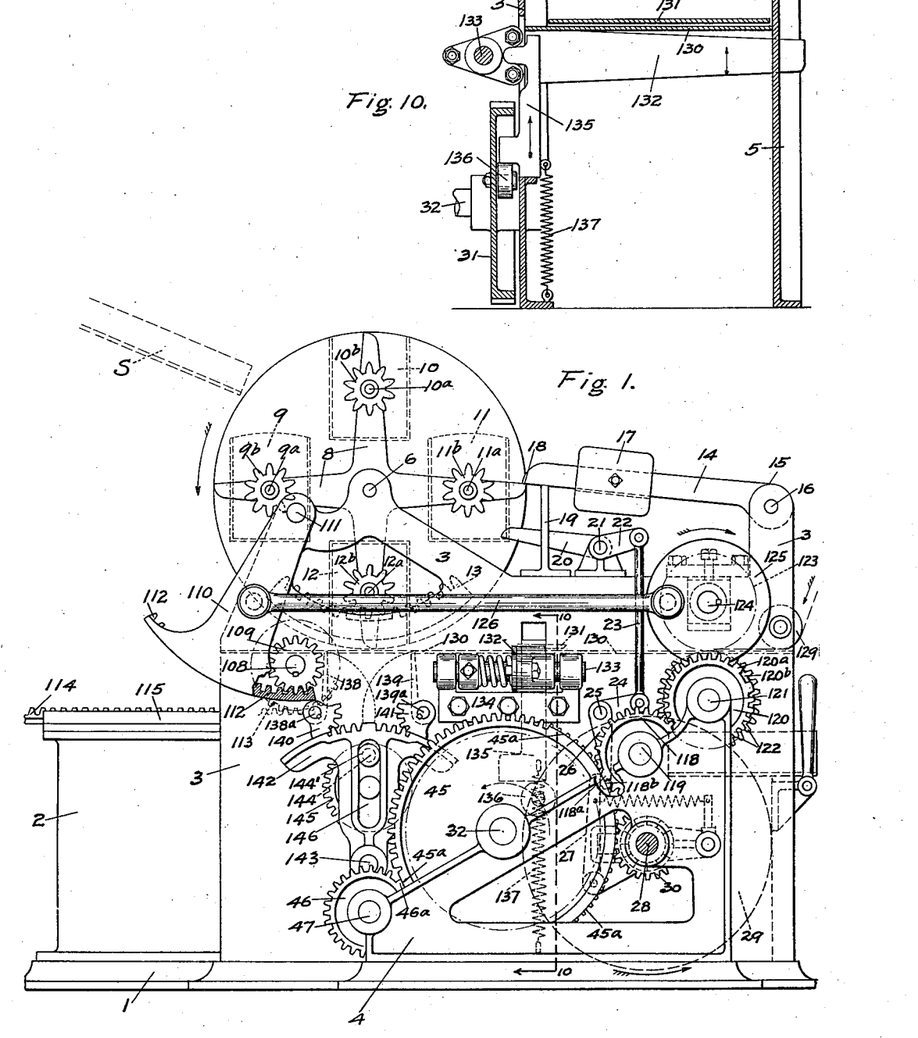
Figure 1 is a side elevation of a machine embodying my invention, with driving pulley shaft shown in section.
Figure 10 is a fragmentary vertical sectional view taken on line 10—10 of Fig. 1, showing the paper cutting knife and its operating mechanism.
Figure 2:
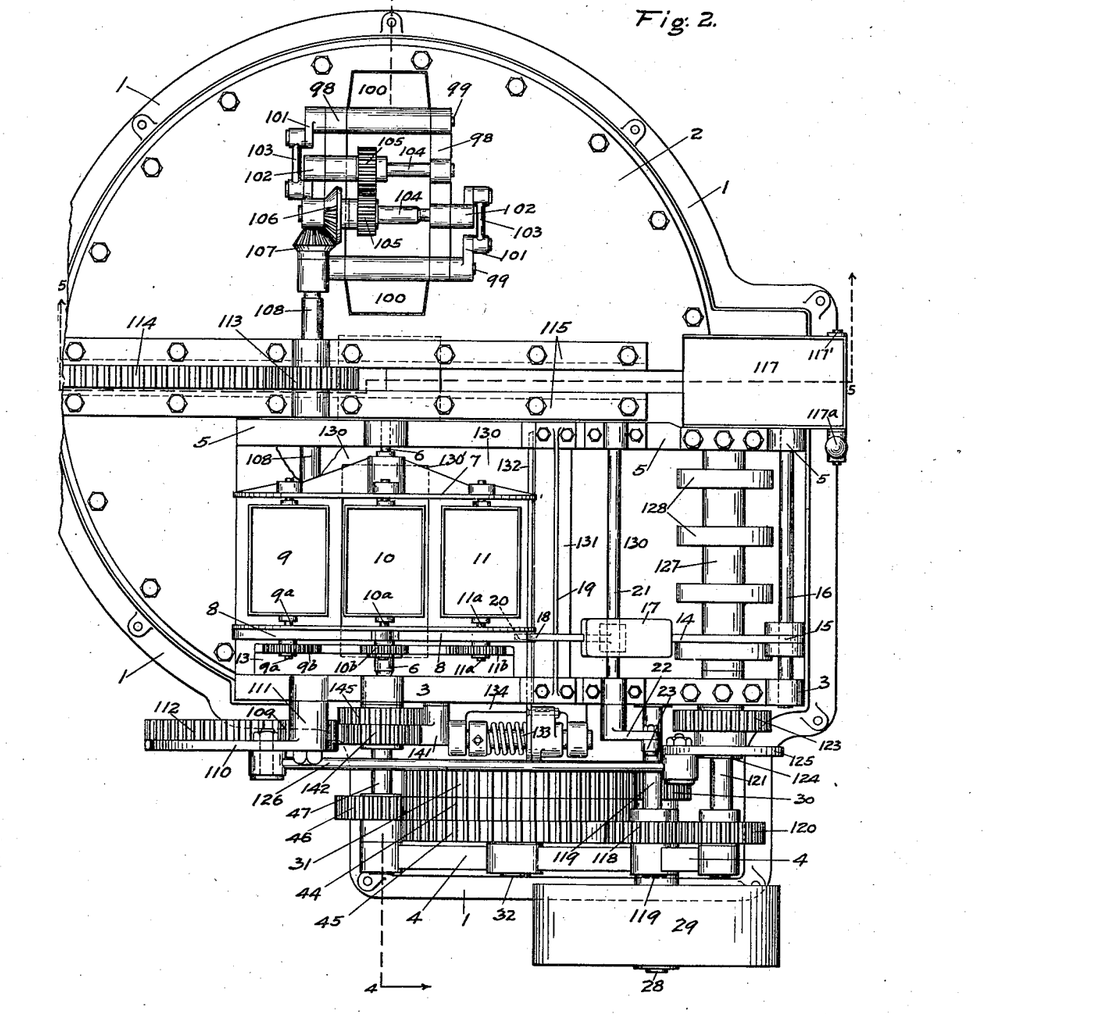
Figure 2 is a top plan view thereof.
Figure 11:
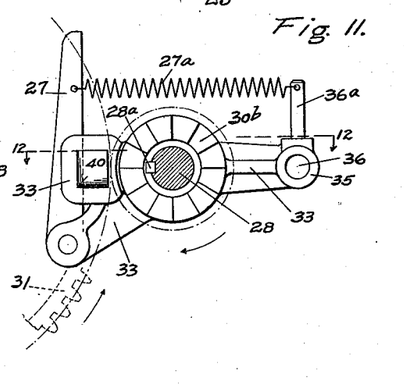
Figures 11, 12 and 13 are enlarged detail views, partially in section, showing an improved clutch mechanism by means of which the machine is intermittently started and stopped.

Referring now to Figs. 1, 2, 3 and 4 of the drawings, I will describe a preferred embodiment of my invention, adapted for weighing and folding into a neat package a certain quantity of raisins, or other similar matter. The machine is mounted upon a base 1, the general form of which will be understood by reference to Fig. 2 said base having a round portion upon which is mounted a cylindrical casing, or housing, 2, within which is contained much of the mechanism which does the folding, or wrapping, of the wrapping paper about the matter being formed into a package. At one side of the housing, resting upon the base 1, are two wall-like, or bearing, supports 3 and 4, while upon the top of said housing is a third bearing support 5. Mounted between the bearing support 3 and 5, upon a shaft 6, are two spaced spider-like members 7 and 8, between which are pivotally supported a plurality of receptacles 9, 10, 11 and 12, said receptacles each being mounted upon suitable shafts, as $9^a$, $10^a$, $11^a$, and $12^a$, upon the outer ends of which are pinions, as $9^b$, $10^b$, $11^b$ and $12^b$, which pinions are adapted to engage a fixed curved segmental rack 13, mounted upon the inside of the bearing support 3, as indicated in dotted lines, Fig. 1, and shown in sectional view, Fig. 3, whereby as said container support is revolved by the weight of a filled receptacle, the pinion, or gears, upon the container supporting shafts mesh with the segmental rack 13, and operate to turn the container upside down, as shown in dotted lines, in Fig. 1, in which container 12 is shown in a discharging position, and container 9 is in position to receive a fresh quantity of the matter to be weighed, as from a spout S, indicated in dotted lines on Fig. 1. A lever 14, is pivoted at one end, as at 15, upon a shaft 16, extending between the bearing supports 3 and 5, as clearly indicated in Figs. 1 and 2, and is provided with a weight 17, adjustably mounted thereon, said lever being extended forwardly into a position to be engaged on its under side by the arms of the spider member 8, as at 18, clearly shown in Fig. 1. Said weighted lever 14, operates to hold the container carrying spiders 7 and 8, from turning, until the container which is receiving the supply becomes sufficiently heavy to lift the weight 17, whereupon said container carrying spiders are released and make a quarter turn, in a manner which will be clearly understood from Fig. 1. The free end of the arm 14, normally rests upon a cross beam 19, upon the top of the machine, as shown in Figs. 1 and 2. A tripping lever 20, is pivotally mounted upon a shaft 21, and projects into the path of the spider arms 8, beneath the lever 14, so that as said spider arms move upwardly, they engage and move said lever 20, before they are stopped by the weight lever 14, and in so doing rock shaft 21, which is provided with a crank arm 22, connected by means of a pitman 23, to a bell crank 24, mounted upon a shaft 25, the other arm 26 of which projects downwardly, as indicated in Fig. 1, into a position to engage and move a tripping lever 27, of a clutch mechanism, mounted upon the main driving shaft 28, upon the outer end of which is mounted a driving pulley 29, as will be clearly understood from Figs. 1, 2, 3 and 4. This clutch mechanism which is shown in large detail views in Figs. 11, 12 and 13, operates to intermittently stop the operating portions of the machine in a manner which I will now describe.

Figure 12:
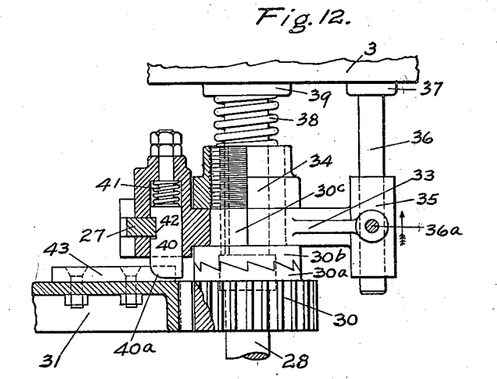
Figure 13:
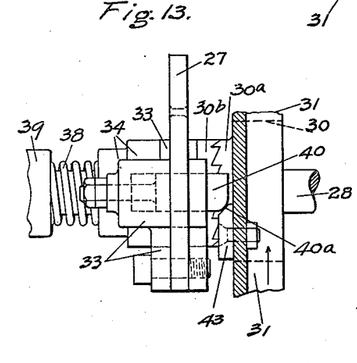

Loosely mounted upon said main shaft 28, is a gear 30, adapted to mesh with and drive a large gear 31, mounted upon a shaft 32, Fig. 2, having its bearings in the supporting bearing members 3 and 4. Mounted upon the inner face of the gear 30, Fig. 12, is a clutch portion $30^a$, adapted to have locking engagement with a clutch member $30^b$ forming a part of a sleeve $30^c$, slidably feathered on shaft 28, and having mounted thereupon a bearing member 33, held in place by means of a nut 34, threaded upon the sleeve member $30^c$. Said bearing member 33, is provided at one end with a guide sleeve 35, slidably mounted upon a supporting shaft 36, projecting from a supporting hub 37, on the support 3. A coiled spring 38, mounted upon the shaft 28, bears at one end against a supporting hub 39, on the member 3, and at its opposite end against said nut 34, and sleeve member $30^c$, thus operating to normally hold said clutch portions $30^a$ and $30^b$ together. Mounted at the opposite end of the bearing member 33, is a plunger-like member 40, normally held extended by means of a spring 41, in the manner clearly indicated in Fig. 12. Said plunger member 40, is provided with a notch 42, in one side, within which is adapted to seat the lever 27, which is normally drawn toward said plunger by means of a coiled spring $27^a$, attached at its opposite end to a pin $36^a$, projecting upwardly from the sleeve 35. The plunger 40, is provided with a rounded corner, as at $40^a$, and is adapted to be engaged by a fixed cam block 43, mounted upon the inner face of the large gear 31, whereby as said block 43 engages said plunger 40, it forces said plunger 40, and the entire bearing member 33, and the clutch portion $30^b$, away from the clutch portion $30^a$. Inasmuch as the clutch portion $30^b$, with its sleeve $30^c$, is slidably secured to the shaft 28, by means of a key, or feather, $28^a$, it will be evident that when said parts are moved away from the gear 30, and its clutch portion $30^a$, as above stated, said gear 30, and the larger gear 31, will stand idle, the shaft 28 turning within said gear 30, and the sleeve $30^c$, turning within the bearing member 33. The plunger 40, in the meantime, will rest upon the block 43, in its stopped position, thus holding the clutch sleeve $30^c$, and the clutch portion $30^b$, out of driving engagement with the clutch $30^a$, on the gear 30. Therefore, when the trip lever 20, has been moved, as hereinbefore described, it operates through the connecting pitman 23, to move the bell crank 24, so that its arm 26, will engage the lever 27, of said clutch mechanism, and move it out of the notch 42, in the plunger 40, of said clutch mechanism, thus allowing the sleeve $30^c$, and its clutch portion $30^b$, and the entire bearing member 33, to be moved on the shaft 28, by the spring 38, into driving engagement with the clutch portion $30^a$, of the gear 30, whereupon said gear 30, is again driven and drives the larger gear 31, and since the block 43 of said gear is thus moved from under the plunger 40, said plunger 40, is again thrust downwardly into its normal position by its spring 41, and the machine continues to run until the gear 31 has made a complete revolution and the cam block 43 thereon has again engaged said plunger 40, and again moved the bearing member 33, and the clutch 30`b`, out of driving engagement with the clutch member 30`a`, and the gear 30.

Figure 7:
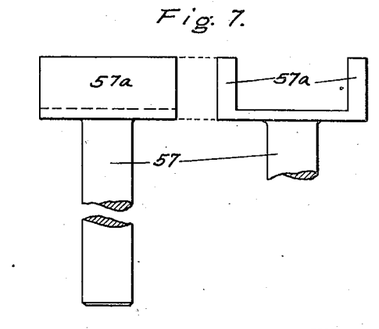
Figure 7 shows side and end views of a guide box member, with bearing shaft, through which guide box member the packages are moved by the plunger, shown in Fig. 6.
Figure 8:
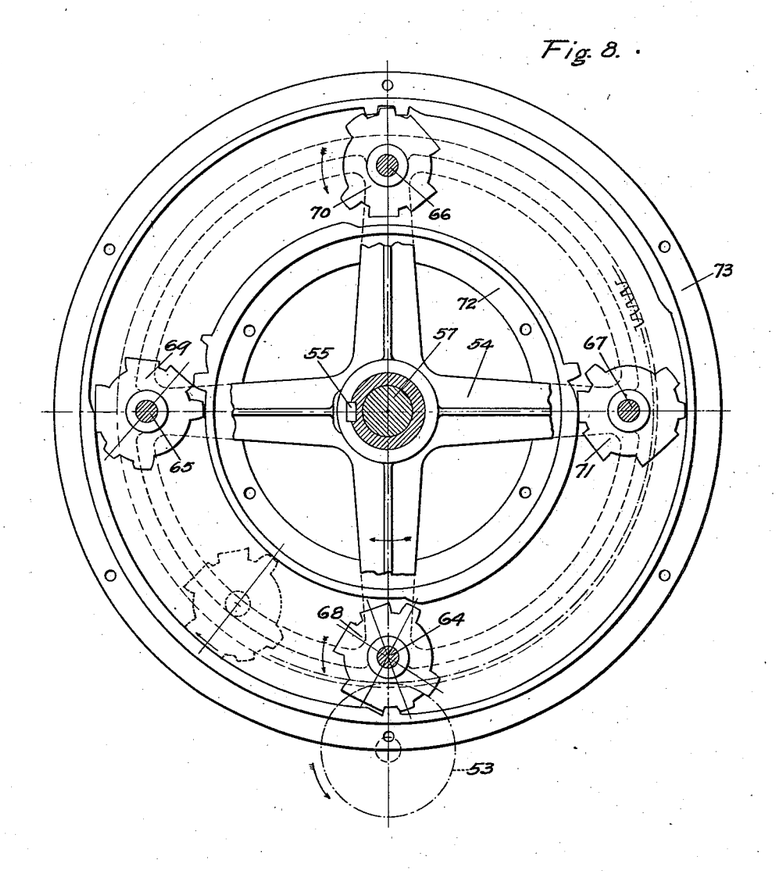
Figure 8 is a horizontal sectional view, taken through Fig. 4, on the line 8—8.

Mounted upon the shaft 32, which carries the large gear 31, just described, are two other large gears 44 and 45, driven with said shaft 32, and the gear 31, in the manner just described. These gears 44 and 45 are alike and have teeth around only a portion of their peripheries, with smooth locking portions, as 44`a` and 45`a` for the balance of the distance, as indicated in Figs. 1 and 4. The gear 44, meshes with, and drives a small gear 46, mounted upon a shaft 47. Gear 46, also has a short smooth locking portion 46`a`, adapted to have a holding contact with the smooth portion 44`a` of gear 44, and by means of which said gear 46 is held against rotation during part of the rotation of gear 44. Gears 46 and 44 have the same number of teeth. The shaft 47, has a bearing in its outer end near the bottom of the supporting member 4, clearly shown in Figs. 1, 2, 3 and 4, while its opposite end projects through a suitable bearing 48, in the supporting member 3, and is provided on its inner end with a beveled gear 49, which meshes with a beveled gear 50, mounted upon the upper end of a shaft 51, mounted in a bearing sleeve 52, secured to the base member 1, within the casing, or housing, 2, near one side thereof, as indicated in Fig. 4. Secured to the hub of the beveled gear 50, is a straight gear 53, adapted to mesh with a large table gear 54, Fig. 4, which is keyed at its hub, as at 55, to a sleeve standard, or hub-like member, 56, mounted upon a central bearing shaft 57, shown in detail in Fig. 7, the lower end of which is supported in a bearing sleeve member 58, secured to the base 1, and the upper end of which is provided with a box-like guide way 57`a`. The sleeve standard, or support, 56, constitutes a hub-like portion for a round table member 59, shown in plan view in Fig. 9, in section in Fig. 4, and in edge view in Fig. 5, said table being supported somewhat below the top of the housing 2. The table gear 54, is provided at its rim, at the ends of its four arms, with four bearing sleeves 60, 61, 62 and 63. Mounted within these bearing sleeves, 60, 61, 62 and 63, are shafts 64, 65, 66 and 67, upon the lower ends of which are mounted four intermittent gears, 68, 69, 70 and 71, said gears being alike, and being keyed to their respective shafts, and adapted to travel bodily in a guideway formed between two annular members 72 and 73, mounted upon the base member 1, the inner member 72, being provided on its outer edge with certain teeth and cam-like portions, and the outer member being provided on its inner face with teeth and cam-like portions, all clearly shown in Fig. 8, and hereinafter more particularly described. Thus as said table gear 54, is driven by the gear 53, the bearing sleeves forming a part of said table gear carry their respective shafts 64, 65, 66 and 67, bodily with them, while the intermittent gear members 68, 69, 70 and 71, move in the guideway formed between the members 72 and 73, and are intermittently turned in opposite directions during their movements, and are also carried through portions of their course of travel without being turned, being held by reason of their special forms, and the construction of the pathway in which they travel, for a purpose and in a manner hereinafter again referred to. The intermittent drive of the machine, through the clutch mechanism, as hereinbefore described, results in driving said table gear 54, a quarter turn at a time. This is due to the relative sizes and forms of the driving gears 44, 46, 49, 50 and 53, the latter of which directly drives said table gear 54.

Figure 5:
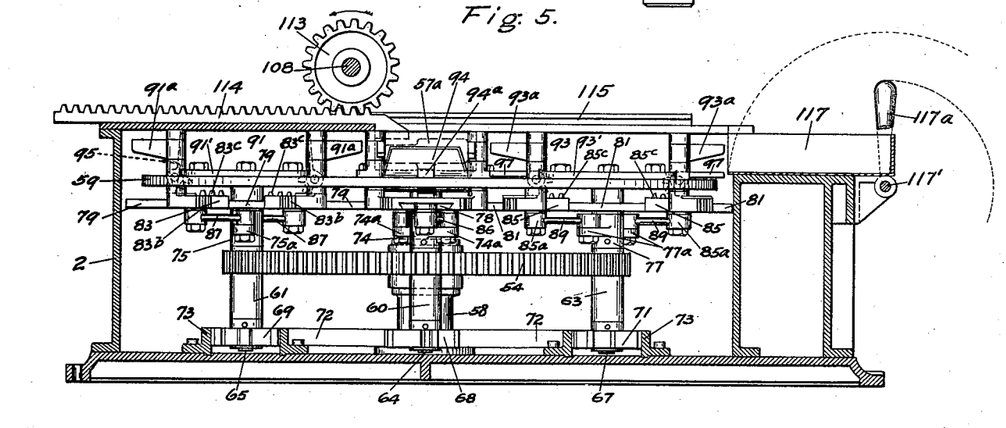
Figure 5 is a vertical sectional view taken through Fig. 2, on the line 5—5.
Figure 9:
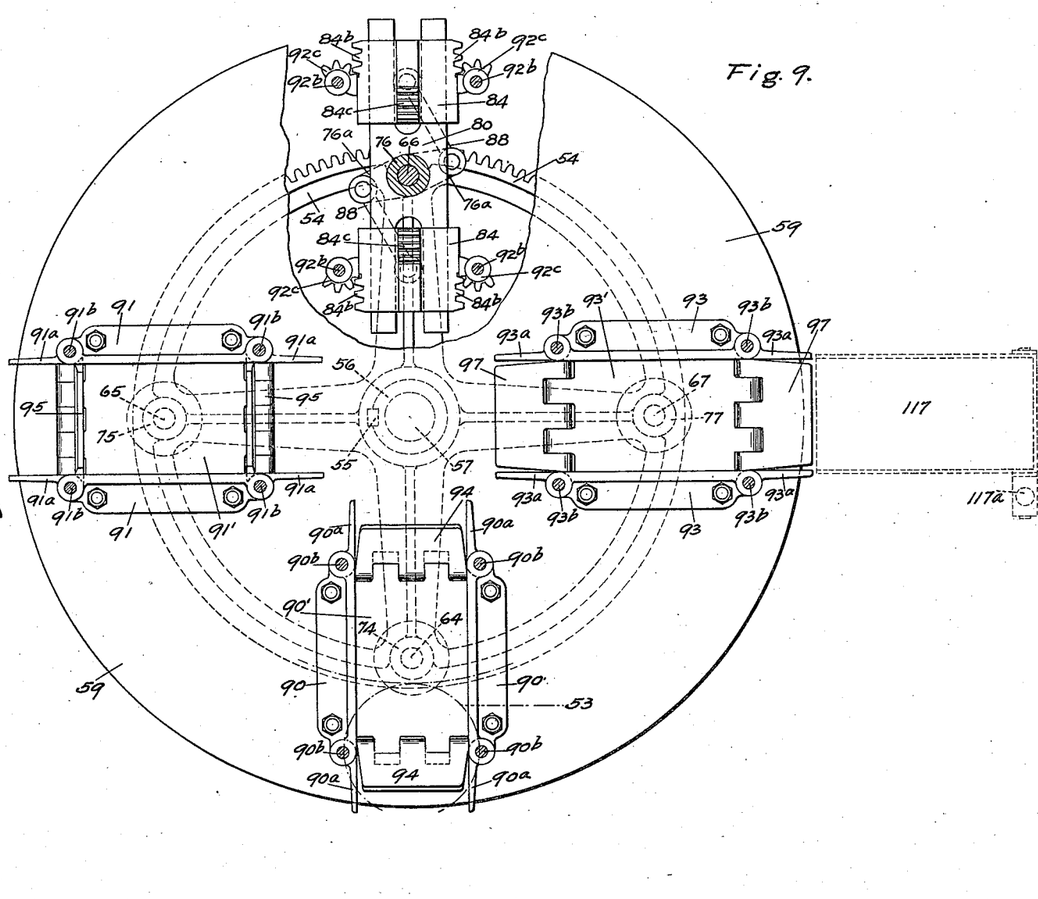
Figure 9 is a top plan view immediately underneath the main top cover plate, with a portion of the revolving table broken out to show one set of the mechanisms for operating certain folding members.

Mounted upon the shafts 64, 65, 66 and 67, which are carried by the table gear, as hereinbefore described, are short sleeve members 74, 75, 76 and 77, each of which is provided with a pair of oppositely projecting arms 74`a`, 75`a`, 76`a` and 77`a`, more clearly indicated in dotted lines, Fig. 9, although shown quite clearly in Fig. 5. Also mounted upon the upper ends of the shafts 64, 65, 66 and 67, carried by said table gear 54, are supporting plates, as 78, 79, 80 and 81, one of said plates 80, being shown in top plan view in Fig. 9, which plates are provided with open slot-like guideways in their opposite ends within which are slidably mounted rack plates, as 82—82, 83—83, 84—84 and 85—85, said rack plates having downwardly projecting hub-like portions, designated, respectively, 82`a`, 83`a`, 84`a`, and 85`a`, and by means of which they are connected, by short crank arms, as 86—86, 87—87, 88—88 and 89—89, to the short arm projecting from the sleeve members 74, 75, 76 and 77, keyed to the upper ends of the shafts 64, 65, 66 and 67. Thus it will be seen that when the shafts 64, 65, 66 and 67, are turned by their intermittent gears, 68, 69, 70 and 71, they turn the sleeve members 74, 75, 76 and 77, and thereby operate to reciprocate the rack plates 82—82, 83—83, 84—84 and 85—85, upon the opposite ends of their respective supporting plates 78, 79, 80 and 81, as will be clearly understood by reference to Fig. 9, wherein a portion of the table 59, is broken out to show the construction and arrangement. Each of the rack plates is provided at its opposite sides with a few gear teeth, as 82`b`, 83`b`, 84`b` and 85ᵇ, and upon their top sides with a few gear teeth, as 82ᶜ, 83ᶜ, 84ᶜ and 85ᶜ.

Referring now to Fig. 9, there is mounted upon the table plate 59, angle side members, as 90—90, 91—91, 92—92 and 93—93, each pair of which is connected by a bottom member, as 90′, 91′, 92′ and 93′, and are provided at their opposite ends with hinged folding fingers, as 90ᵃ—90ᵃ, 91ᵃ—91ᵃ, 92ᵃ—92ᵃ and 93ᵃ—93ᵃ, said folding fingers being pivoted upon operating shafts, as 90ᵇ—90ᵇ, 91ᵇ—91ᵇ, 92ᵇ—92ᵇ and 93ᵇ—93ᵇ, said shafts projecting through said table plate 59, and being provided at their lower ends with intermittent gear members, the same as those shown in Fig. 9, on the shafts 92ᵇ—92ᵇ, here shown in section, said intermittent gears being designated as 92ᶜ—92ᶜ, each being provided with three teeth and one straight cam portion, adapted to fit the straight sides of the rack plate 84, as will be clearly understood from Fig. 9. Hingedly mounted to the ends of the bottom members 90′, 91′, 92′ and 93′, in suitable openings through said table plate 59, are end folders 94—94, 95—95, 96—96 and 97—97, said end folding members being provided on the under sides of their hinge portions with gear teeth, as 94ᵃ, 95ᵃ, 96ᵃ and 97ᵃ, adapted to be engaged by the rack teeth on the upper surface of the rack plates 82, 83, 84 and 85, whereby, as said rack plates are moved in one direction, said end bottom folders 94, 95, 96 and 97, are operated, and when said rack plates are moved in the opposite direction the end side folders 90ᵃ, 91ᵃ, 92ᵃ and 93ᵃ, are operated in the manner described.

Figure 3:
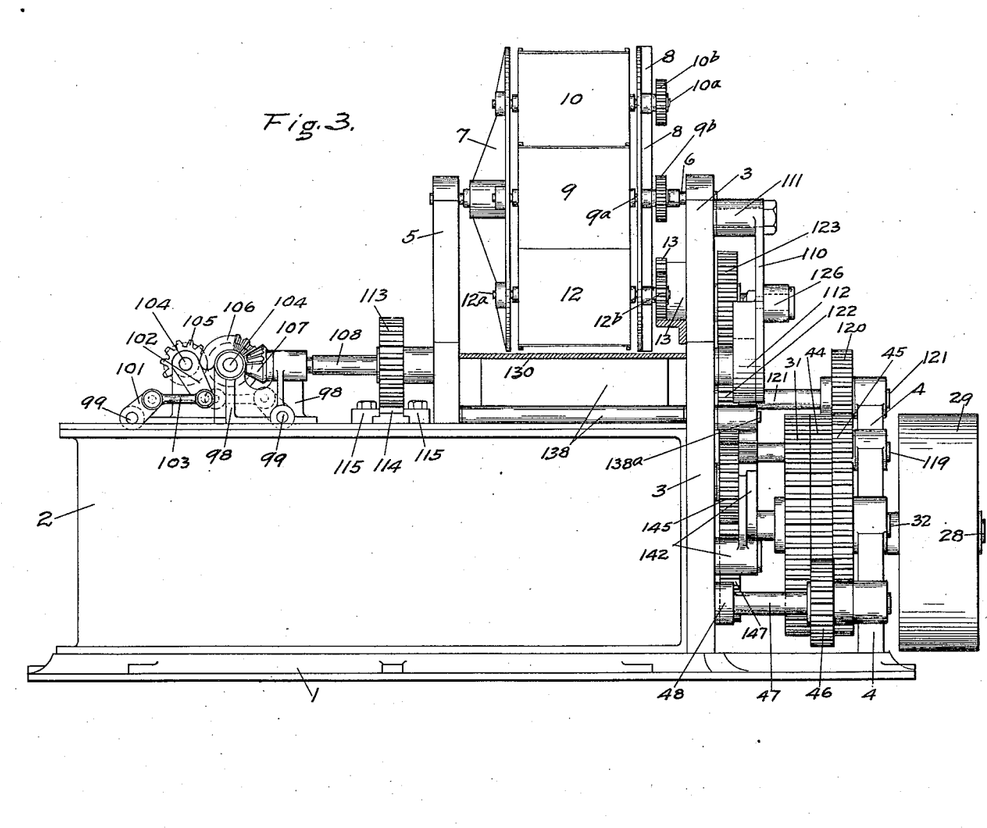
Figure 3 is a side elevation of the same, looking from the left hand side of Fig. 2.
Figures 4, 14, 15, 16, 17, 18:
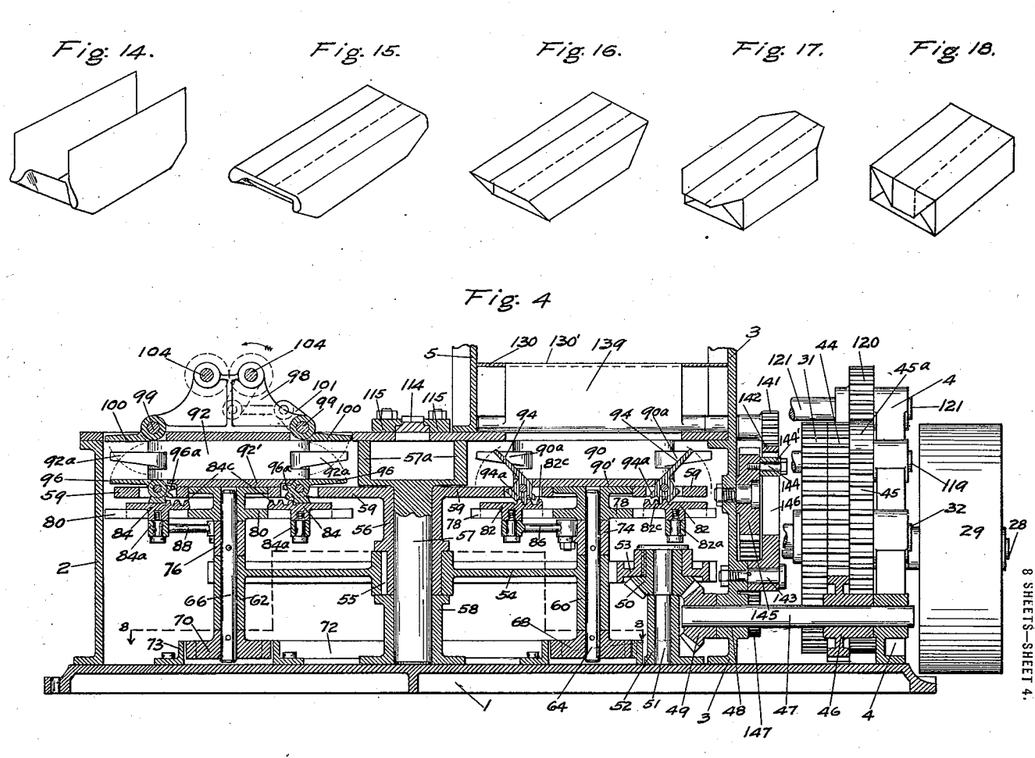
Figure 4 is a vertical sectional view taken through Fig. 2, on the line 4—4.
Figures 14, 15, 16, 17 and 18 are perspective views showing the successive steps in the wrapping operation, Fig. 14 showing the position assumed by the wrapping paper just after the matter to be wrapped has been discharged thereon, and has forced it down among the folding members, and Fig. 18 showing the wrapped package as discharged from the machine.
Figure 6:
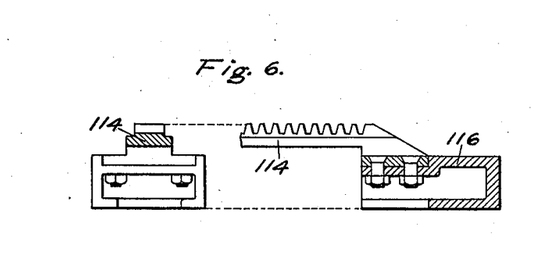
Figure 6 shows cross, and longitudinal, sectional views of a feed rack plunger member, the rack portion of which is shown in side view on Fig. 5.

Referring to Figs. 2, 3 and 4, I will next describe the top folders. Mounted upon the top plate of the housing 2, are two spaced bearing members 98—98. Hingedly mounted upon bearing shafts 99—99, in suitable openings in the top plate of said casing, are two folding plates 100—100, adapted to be folded downwardly, clearly seen in Figs. 2 and 4, said plates being secured to said shafts 99, and said shafts 99, being provided at their outer ends with crank arms, as 101—101, Fig. 2, connected with crank arms 102—102, mounted upon shafts 104—104, in said bearing members 98—98, and provided with intermeshing gears 105—105, one of said shafts 104, being provided with an intermittent beveled gear 106, having a smooth portion and a toothed portion, as clearly indicated in Figs. 2 and 3, which intermittent gear 106, is adapted to mesh with a similar gear 107, mounted upon the end of a shaft 108. Said shaft 108, extends across the machine in the manner indicated in Figs. 2 and 3, and is provided at its opposite end with a gear 109, shown in Fig. 1, and also partially seen in Fig. 2, which gear 109, is adapted to be turned first in one direction and then in the opposite direction by means of a swinging member 110, pivotally mounted at its upper end to the supporting bearing member 3, as at 11, Figs. 1, 2 and 3, and at its lower end provided with a curved segmental rack 112, adapted to mesh with and operate with said gear 108, as said swinging member 110, is oscillated, in a manner hereinafter described. Also mounted upon said shaft 108, over the middle portion of the main casing, or housing, is a gear 113, adapted to operate a sliding rack 114, slidably mounted between two track members 115—115, mounted on the top of said housing, or casing, as indicated, said rack being provided at its forward end with a box-like plunger member 116, shown in section in Fig. 6, which box-like plunger 116, normally rests in the box-like guide member 57ᵃ, shown in detail in Fig. 7, and also indicated in its proper place in Fig. 5, by its reference numeral 57ᵃ, the plunger not being seen in said Fig. 5, because it is between the sides of the box member 57ᵃ. The function of said rack 114, and its plunger 116, is to intermittently move forward for the purpose of pushing the wrapped package from the last folding position and into a box or carton placed in the holder 117, in position to receive the same, and will be understood from Figs. 1, 2 and 5, and indicated in dotted lines in Fig. 9. Said box holder is pivoted at one corner, as at 117′, and is provided with a handle 117ᵃ, for tilting the same to discharge the boxed package.

Referring to the large gear 45, shown in Figs. 1, 2, 3 and 4, mounted upon the shaft 32, and driven from the pulley 29, through the shaft 28, and the small gear 30, and large gear 31, as hereinbefore described, said gear 45, meshes with and drives a small gear 118, Fig. 1, mounted upon a shaft 119, between the bearing members 4 and 3, which gear 118, meshes with and drives a gear 120, mounted upon a shaft 121. Gear 118 has a large tooth 118ᵃ, adapted to engage and be held by the smooth part 45ᵃ of gear 45, while the latter makes a partial rotation, shown in Fig. 1. Said gear 118, also has a corresponding gap 118ᵇ, in its periphery, whereby said gear 118, can drive gear 120, which is also provided with a big tooth 120ᵃ, and a gap 120ᵇ, corresponding to the construction of gear 118, so that there can be a driving mesh between the two gears 118 and 119. Mounted upon said shaft 121, is a second gear 122, seen behind the gear 120, in Fig. 1, also partially seen in Fig. 3. This gear is directly underneath a gear 123, Fig. 2, which meshes therewith, and is driven thereby, the gear 123, being indicated by the dot and dash pitch line in Fig. 1. The shaft 121, extends from supporting bearing member 4, through intermediate bearing member 3, to supporting bearing member 5, as seen in Fig. 2. The gear 123, is mounted upon a shaft 124, seen in end view, Fig. 1, upon the outer end of which is mounted a crank disc 125, connected by means of a pitman 126, to the swinging rack member 110, as clearly seen in Figs. 1 and 2, and by means of which said swinging rack member 110, is oscillated. Also mounted upon the shaft 124, between the supporting bearing members 3 and 5, is a paper feeding device 127, provided with rubber collars 128, which bear upon a similar metal feeding device directly thereunder and mounted upon the shaft 121, said paper feeding device being adapted to feed a sheet of wrapping paper forwardly as it is received therebetween from underneath the small rollers 129, seen at the right hand side of Fig. 1, the paper being indicated in broken lines as traveling in the direction indicated by the little arrow. One revolution of the shafts 121 and 124, which carry the paper feeding devices, moves the paper forwardly, as indicated by the broken lines in Fig. 1, upon a plate 130, and underneath a top plate 131, shown in Fig. 10, and also indicated in dotted lines in Fig. 1, said paper being moved forwardly until it rests over an opening 130', Fig. 2, in said plate 130, directly underneath the discharging position of the containers, indicated by container 12, shown in dotted line, Fig. 1. When the proper amount of paper has been fed forwardly, a knife 132, shown in Fig. 10, pivotally mounted at one end upon a shaft 133, supported in a suitable bracket member 134, secured to the side of the supporting member 3, as indicated in Figs. 1 and 2. Said knife 132, is operated by means of a vertically reciprocating member 135, adapted to be engaged and lifted by means of a roller 136, upon the inside of the large gear 31, as shown in Fig. 10, and indicated in dotted lines, Fig. 1, each time said gear 31 makes a complete revolution, said operating member 135, being normally drawn down by means of a coiled spring 137, attached at its lower end to the base of the bearing support 3, as clearly indicated in Figs. 1 and 10. Therefore with each revolution of the gear 31, the knife 132, is raised in a way to cut the paper between the plates 130 and 131.

I will next describe the folding means which makes the first top side folds of the wrapping paper down on to the top of the package being formed. Referring to Figs. 1, 3 and 4, there are hingedly mounted between the supporting members 3 and 5, immediately above the main casing, or housing, 2, and underneath the weighing receptacles and immediately under the top plate 130, two side folding wings 138 and 139, said folding wings being shown in end views, in upright positions, in dotted lines, Fig. 1, directly underneath the discharging container 12, which is also shown in dotted lines in said figure. Said folding wings 138 and 139, are mounted upon the shafts 138ª and 139ª, provided on their outer ends with segmental gears 140 and 141, adapted to be operated by means of an oscillating rack member 142, pivoted at its lower end, as at 143, and operated by means of a crank pin 144, upon a gear 145, secured in the side of the supporting member 3, as clearly indicated in Figs. 1 and 4, said crank pin 144, being provided with a roller 144', Fig. 4, operating in a slot 146, in said oscillating member 142, whereby as said gear 145, is rotated by a gear 147, upon the shaft 32, said oscillating member 142, is moved first in one direction, thereby operating to rock one of said folding wings down, and then as said oscillating member 142, starts back, it operates to raise said folding wing, and as said oscillating member 142, moves to the opposite direction, it moves the other folding wing down and then as said oscillating member is returned to its normal position, shown in full lines in Fig. 1, it raises said last mentioned folding wing into upright position, each of said folding wings being held in its upright position while the other is moved downwardly and up again by reason of the cam engaging portion of the segmental gears 140 and 141 bearing upon the smooth portions of the oscillating member 142.

The operation of my invention may be briefly described as follows:

Referring first to Fig. 1, we will assume that raisins are being fed from the spout S, and are dropping into the container 9, which is held in position to receive the same, by means of the weighted lever 14, the end of which rests upon one of the arms of one of the revoluble spider members between which said containers are supported, as at 18. As soon as the pre-determined amount of raisins have been placed in the container 9, it will overbalance the weighted lever 14, whereupon said filled container will move by gravity down to the position of the container 12, being inverted as it moves by reason of the engagement of its gear 9ᵇ, with the fixed segmental rack 13, in a manner which will be clear from Fig. 1. As said spider member thus makes a quarter turn, the arm next to engage the weighted lever 14, will first engage the projecting arm 20, and will rock the shaft 21, and through the connections 22, 23, 24, 25 and 26 will move the lever 27 of the clutch mechanism, shown in Figs. 11, 12 and 13, thus connecting the mechanism of the machine proper with the driving shaft 28, which is being driven constantly from the pulley 29. It is to be understood, of course, that the clutch mechanism has been previously thrown out of driving engagement, in the maner hereinbefore described, so that the machine, other than the pulley 29, and the driving shaft 28, are standing still. As the clutch member is thus thrown into driving engagement, it locks the gear 30, to the shaft 28, which gear 30, drives the large gear 31, on the shaft 32, and on which shaft is also mounted and driven therewith, the large gears 44 and 45. The gear 45, through the gear 118, drives a gear 120, on the shaft 121, which drives the paper feeding mechanisms which are mounted on shafts 121 and 124, one above the other, and only one of which, 127—128, is shown, Fig. 2, which paper feeding mechanism feeds a proper amount of wrapping paper forwardly over the plate 130, and over the opening 130' therein, Fig. 2. Mounted on the inner face of the large gear 31, is an operating roller 136, shown in dotted lines, Fig. 1, which at the proper time operates the knife operating member 135, Fig. 10, which raises the knife 132, and cuts the paper at a point near the top plate 131, shown in Figs. 1 and 2. This feeding of the paper forwardly has taken place during the movement of the loaded container downwardly, and before it is inverted, whereupon as the loaded container 9, is inverted, as described, its contents is discharged upon the wrapping paper over the opening 130' in the plate 130, directly under the inverted container, indicated by the position of container 12, in Fig. 1. The weight of the contents upon the wrapping paper forces it through the opening 130' and it settles down between the upstanding side members 138 and 139, shown in dotted lines, Fig. 1, and in full lines Figs. 3 and 4, the paper and contents assuming the position indicated in Fig. 14, the end folding members 94—94, being shown in their receiving position in sectional view, Fig. 4. The gear 145, Fig. 1, which drives the oscillating rack member 142, is driven by the gear 147, on the inner end of the shaft 32, shown partially in Figs. 3 and 4, and said oscillating rack member 142, operates, as it moves in one direction, one of the top side folding members, as 138, and then as it moves in the opposite direction it operates the other top side folding member 139, thereby folding the upper sides of the wrapping paper over one upon the other, as indicated in Fig. 15. If the matter being wrapped is more or less sticky, as are raisins, it will be evident that the paper when thus pressed down thereupon, will not only press the matter down, but will readily stick to the matter as it is pressed into form, indicated in Fig. 15. The big gear 44, drives gear 46, on the shaft 47, which extends into the housing heretofore described and through suitable gear connections 49, 50, 52 and 53, drives the table gear 54, which carries the folding mechanisms hereinbefore described. As this table gear starts in the direction indicated by the arrow on one of the arms of said table gear in Fig. 8, the shaft 64, is given a partial turn by the engagement of the intermittent gear 68, with the tooth on the outer guide member 73, with which it is shown in mesh, in Fig. 8. This partial revolution of said shaft 64, operates (Fig. 4), through the sleeve 74, and the short arms 86, to move the rack plates 82—82, apart and thus raise the end folders 94—94, into a vertical position, pressing inwardly the ends of the package and the matter therein, as indicated in Fig. 16. The intermittent gear 68, is held against further rotation during the turning of the table gear 54, by the sliding contact of one of its cam portions with the guide member 73, as indicated in dotted lines, Fig. 8. When said table gear has turned to bring the intermittent gear 68, to the position occupied by the intermittent gear 69, Fig. 8, it is engaged by the projecting teeth on the outside of the inner guide member 72, and is turned in the opposite direction during its course of travel, thereby turning its shaft 68, in the opposite direction and operating the rack plates 82—82, in the opposite directions, or toward each other, more clearly understood from Figs. 4 and 9, which rack plates operate the four shafts $90^b$—$90^b$—$90^b$—$90^b$, which are now in the positions occupied by the corresponding shafts $92^b$, of one of the other folding mechanisms, Fig. 9. The operation of these four vertical shafts operate the side end folders $90^a$—$90^a$—$90^a$—$90^a$, which fold the side portions of each end of the package inwardly, in the manner indicated in Fig. 17. As said table gear continues its revolution, the particular mechanism, which is folding the package now being described, moves to the position occupied by the folding mechanisms designated by the numeral 93, with its different exponents, Fig. 9. In this position the top folding members 100—100, shown in Figs. 2, 3 and 4, are operated through the shaft 108, which is driven from the gear 109, by the movements of the oscillating member 110, which is oscillated by the pitman 126, connected to the pitman disc 125, whereupon the top end portions of the wrapping paper are folded downwardly, as indicated in Fig. 18. The continued revolution of the shaft 108, by means of the gear 113, thereon, Figs. 2, 3 and 5, moves the rack 114, forwardly, so that its plunger member 116, engages said package at this finished stage of the folding operation and ejects it forwardly into a suitable box, or carton, placed in the holder 117, shown in Figs. 2 and 6, from which the carton, with the folded package of matter therein, can be discharged by means of the operating handle $117^a$.

It will be understood, of course, that all of the mechanisms hereinbefore described are so connected to each other and are so timed in their operations, that the clutch mechanism is tripped during the movement of the loaded receptacle to its discharging position, the machine proper is started, the wrapping paper is fed into position to receive the matter, and the top side folders, the end folders, the end side folders, and the end top folders are successively operated, and the packages are discharged at short intervals from said machine. These movements are all accomplished by means of intermittent gear connections, as seen between the gear 45, and the gear 118, and between the gear 44 and the gear 46, and particularly between the intermittent gear construction fully illustarted in Fig. 8, by means of which the intermittent gears 68, 69, 70 and 71 traveling bodily in the pathway between the annular members 72 and 73, are turned, and held and reversed in order to operate the shafts which operate certain of the folding members, in the manner hereinbefore described.

I am aware that many changes in the detailed mechanisms here shown and described for purposes of illustration can be made without departing from the spirit of my invention, and I do not, therefore, limit my invention except as I may be limited by the claims hereunto appended and forming a part hereof.

I claim:

1. In combination, a revoluble table member provided with wrapper-folding mechanisms adapted to receive a quantity of matter to be wrapped, means for intermittently revolving said table member and its wrapper-folding mechanisms from one position to another about a vertical axis, means for feeding wrapping paper to said folding mechanisms, means for discharging a quantity of matter to be wrapped onto said paper, intermittent gears connected with each set of wrapper-folding mechanisms for operating the same, and means in the path of travel of said intermittent gears for automatically operating them as said table member is revolved, whereby to operate said wrapper-folding mechanisms and uniformly fold said paper about said matter, substantially as described.

2. In a wrapping machine, a revoluble table member provided with a plurality of sets of folding mechanisms, intermittent gears connected with each set of folding mechanisms, annular members forming an annular guideway for said intermittent gears, and adapted to hold and to turn said intermittent gears as they travel in said guideway, for operating said folding mechanisms, driving means for said revoluble table, and means for intermittently interrupting the driving operation of said table, for the purpose described.

3. In a wrapping machine, a revoluble table member provided with a plurality of sets of folding mechanisms, intermittent gears connected with each set of folding mechanisms for operating the same, annular members forming a guideway for said intermittent gears, and adapted to hold and turn said intermittent gears as they travel in said guideway, whereby to successively operate said folding mechanisms, means for feeding wrapping paper to said folding mechanisms, and means for feeding matter to be wrapped onto said paper.

4. In a wrapping machine of the character referred to, in combination, a supporting member adapted to turn about a vertical axis, means for intermittently revolving the same a predetermined distance, a plurality of sets of hinged folding members, rack and gear mechanisms for operating said folding members, means for feeding wrapping paper to said folding mechanisms, means for feeding matter to be wrapped onto said wrapping paper, intermittent gears connected with and moving with said supporting member for operating said folding members, means in the path of travel of said intermittent gears for operating the same intermittently as they are moved from one position to another, whereby to successively operate said folding members, and means for discharging the wrapped matter from said machine, substantially as described.

5. In a wrapping machine of the character referred to, in combination, a supporting member adapted to rotate, hinged folding members mounted upon and moving with said supporting member, means for successively operating said folding members to fold wrappers about matter to be wrapped, means for feeding matter to be wrapped to said folding members, means for feeding wrappers to said folding members, and means for intermittently revolving said supporting member and said hinged folding members, whereby the latter are successively operated as they are moved from one position to another with said supporting member, substantially as described.

6. In a wrapping machine of the character referred to, a table member mounted to revolve about a vertical axis, a plurality of sets of hinged folding members mounted thereon and moving therewith, gear mechanisms for actuating said folding members, means carried by said table member and connected for operating said gear mechanisms and said folding members, said means being adapted to be intermittently actuated as said table member is revolved about its axis, fixed means adapted to be engaged as said table member is revolved from one position to another for causing the successive operation of said folding members, means for feeding wrappers to said folding members, and means for feeding matter to be wrapped onto said paper and among said folding members, substantially as described.

7. In combination, a supporting member adapted to be revolved about a vertical axis and provided with a plurality of sets of hinged folding members moving therewith, rack and gear means for actuating said folding members, means connected therewith for actuating said folding members successively as said supporting member is revolved from one position to another, means for intermittently revolving said supporting member, means for feeding wrapping material to said folding members, means for feeding a predetermined amount of matter to be wrapped onto said paper, and means for discharging said wrapped matter from said machine, substantially as shown and described.

Signed at Portland, Multnomah County, Oregon, this 28th day of December, 1915.

GOTTHOLD L. LANGER.

In presence of—
I. M. GRIFFIN,
JAMES JOHNSON.